July 11, 1944.   C. G. TALBOT   2,353,201
AIRCRAFT CABIN SUPERCHARGER SYSTEM
Filed Sept. 30, 1942
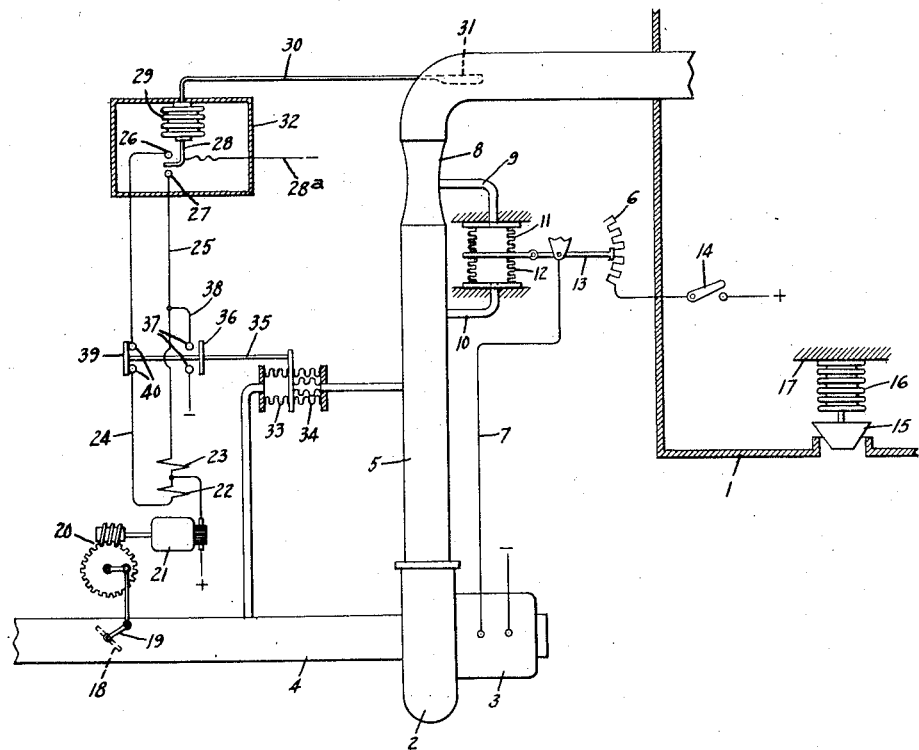
Inventor:
Curtis G. Talbot,
by Harry E. Dunham
His Attorney.

Patented July 11, 1944

2,353,201

UNITED STATES PATENT OFFICE 2,353,201

AIRCRAFT CABIN SUPERCHARGER SYSTEM

Curtis G. Talbot, Scotia, N. Y., assignor to General Electric Company, a corporation of New York Application September 30, 1942, Serial No. 460,214

6 Claims. (Cl. 98—1.5)

The present invention relates to aircraft supercharger systems and has for its object to provide an improved construction and arrangement for supplying air to an aircraft cabin and at the same time regulating the temperature of the air.

For a consideration of what I believe to be novel and my invention, attention is directed to the following specification and to the claims appended thereto.

In the drawing, the figure is a diagrammatic view of a system embodying my invention.

Referring to the drawing, 1 indicates the cabin of an aircraft which it is desired to supercharge. Connected with the cabin for supplying air thereto is a supercharger comprising a centrifugal compressor 2 which is shown in the present instance as being driven by an electric motor 3, although it may be driven by any suitable means. Air is supplied to compressor 2 through a conduit 4 and is discharged from the compressor through a conduit 5 to the cabin. The speed of the supercharger is controlled to cause it to supply the desired amount of air to the cabin. To this end, a rheostat 6 is arranged in the motor circuit 7 and is adjusted by means responsive to the flow through conduit 5 to adjust rheostat 6 to maintain motor 3 at the required speed. The flow responsive device is shown as comprising a venturi 8 in the conduit 5 which is connected by pipes 9 and 10 to opposed bellows 11 and 12 having their movable ends pivotally connected to the arm 13 of rheostat 6. With this arrangement, if the flow increases, additional resistance is inserted in the motor circuit to decrease the speed of the motor, thus effecting a decrease in the flow of air, and if the flow decreases, resistance is cut out of the motor circuit to increase the speed of the motor, thus effecting an increase in the flow of air. In the cabin is a hand switch 14 for opening and closing the motor circuit.

Located in a wall of the cabin is a suitable valve 15 which is controlled by the pressure in the cabin to maintain a constant pressure therein. In the present instance, the valve is carried by an evacuated bellows 16 carried by a fixed support 17. As the pressure in the cabin increases and decreases, bellows 16 will be compressed and distended to position valve 15 to maintain the desired cabin pressure.

Associated with the compressor is valve means for throttling the flow of air through the compressor. This may take the form of a throttling valve located in the path of the air flow, for example, in the inlet conduit or in the discharge conduit of the compressor. In the present instance, it is shown as being located in inlet conduit 4 and as comprising a throttling valve 18 having an actuating arm 19 connected through gearing 20 to a reversing electric motor 21. The fields 22 and 23 of motor 21 are connected by conductors 24 and 25, respectively, to contacts 26 and 27. Located between contacts 26 and 27 is a contact arm 28 which is connected to a device responsive to the temperature of the air flowing through conduit 5 to the cabin, the arrangement being such that when the temperature of the air tends to increase, contact arm 28 engages contact 27 and when the temperature tends to decrease, contact arm 28 engages contact 26. Contact arm 28 is connected to one side of a source of electrical energy as is indicated at 28ª. The temperature responsive device in the present instance is in the form of a bellows 29, the interior of which is connected by a pipe 30 to bulb 31 located in conduit 5. Bellows 29, pipe 30, and bulb 31 are filled with a suitable fluid which expands and contracts with changes in temperature to effect movement of contact arm 28. Bellows 29 and its associated contacts are sealed in a housing 32 so that the bellows is not affected by ambient pressure or temperature.

With the foregoing arrangement, if the temperature of the air flowing through conduit 5 increases, bellows 29 is distended to connect field winding 23 of the motor in circuit to effect operation of motor 21 in a direction to move valve 18 toward open position, thus decreasing the throttling of the air supplied to the compressor and thereby decreasing the temperature of such air. In a similar manner, if the temperature of the air flowing through conduit 5 decreases, bellows 29 contracts to move contact arm 28 into engagement with contact 26, closing the circuit on motor field winding 22 to effect operation of the motor in a direction to close somewhat valve 18, thus increasing the throttling of the air supplied to the compressor and thereby increasing the temperature of such air.

In connection with the foregoing, it will be understood that the temperature of a volume of air delivered by a compressor is a function of the speed of the compressor required to deliver such volume, i. e., the amount of work which it is called upon to do. Hence the temperature of the air delivered by a compressor can be varied by throttling the flow of air through the compressor by means such as a throttle valve located in the compressor inlet, since by throttling such flow, it becomes necessary to compress the air against a higher pressure ratio which effects an increase in the temperature of the air delivered by the compressor due to the heat of adiabatic compression. If the throttling is increased, the speed of the compressor must be increased in order to maintain the same flow of air from the compressor which in turn means that the temperature of the air delivered by the compressor is increased. On the other hand, if the throttling is decreased, the speed of the compressor must be decreased to maintain the same flow of air from the compressor which means that the temperature of the air delivered by the compressor is decreased. According to my invention, I utilize the throttling of the air flow through the compressor to regulate the temperature of the air supplied to the cabin.

To protect the supercharger from overspeed, i. e., to prevent throttling of the flow through the compressor to an extent such that the supercharger would have to operate above its critical speed to maintain the volume of flow, and also to protect it against unstable operation or pulsating, I provide means responsive to the ratio between the inlet pressure and the discharge pressure of compressor 2 which takes control of the throttling when such pressure ratio reaches a predetermined value. The mechanism for accomplishing this, which may be similar to that shown in patent to Standerwick 1,508,731, September 16, 1924, is illustrated conventionally as comprising two opposed bellows 33 and 34 having their movable ends connected by a rod 35 to a connector 36 adapted to bridge a pair of contacts 37 in a circuit 38 in shunt to contact 27 and to a connector 39 which bridges a pair of contacts 40 in circuit 24. Normally, the parts stand in the positions shown in the drawing, connector 39 bridging contacts 40 and connector 36 being out of engagement with contacts 37. When the ratio across the compressor reaches a predetermined value, rod 35 is actuated to move connector 39 out of engagement with contact 40, thus opening the circuit of motor winding 22 so that valve 18 can not be further closed, even though the temperature responsive device calls for further closing of the valve to increase the temperature. Further increase in the ratio across the compressor brings connector 36 into engagement with contacts 37, thus connecting the motor field 23 directly in circuit independently of the temperature responsive device, i. e., contact 27, to effect an opening movement of valve 18. Valve 18 will then remain under control of the ratio device until such time as the ratio decreases to a point at which connector 39 again engages contacts 40.

By way of example, I have shown a simple and known form of temperature responsive device for effecting operation of motor 21. It is to be understood that any suitable means for effecting this result may be utilized.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. In combination, an enclosure, a compressor for supplying air to the enclosure, means responsive to the amount of air delivered by the compressor to the enclosure for regulating the speed of the compressor, throttling means in the compressor inlet, and means responsive to the temperature of the air delivered by the compressor to the enclosure for effecting opening movement of said throttling means upon increase in temperature and closing movement of said throttling means upon decrease in temperature for regulating the temperature of the air supplied by the compressor to the enclosure.

2. In combination, an enclosure, a compressor for supplying air to the enclosure, means responsive to the amount of air delivered by the compressor to the enclosure for regulating the speed of the compressor, throttling means controlling flow of air through the compressor, and means responsive to the temperature of the air delivered by the compressor to the enclosure for effecting opening movement of said throttling means upon increase in temperature and closing movement of said throttling means upon decrease in temperature for regulating the temperature of the air supplied by the compressor to the enclosure.

3. In combination, an aircraft having a cabin, a centrifugal compressor for supplying air to the cabin, means controlled by the air supplied to the cabin for regulating the speed of the compressor in accordance with the air requirements of the cabin, and means responsive to the temperature of the air supplied to the cabin for controlling the flow of air through the compressor for effecting opening movement of said means upon increase in temperature and closing movement of said means upon decrease in temperature for regulating the temperature of the air supplied by the compressor to the cabin.

4. In combination, an aircraft having a cabin, a centrifugal compressor for supplying air to the cabin, means controlled by the air supplied to the cabin for regulating the speed of the compressor in accordance with the air requirements of the cabin, a throttling valve in the compressor inlet, and means responsive to the temperature of the air supplied by the compressor to the cabin for effecting opening movement of said throttling valve upon increase in temperature and closing movement of said throttling valve upon decrease in temperature for regulating the temperature of the air supplied by the compressor to the enclosure.

5. In combination, an enclosure, a compressor for supplying air to the enclosure, means responsive to the amount of air delivered by the compressor for regulating the speed of the compressor, throttling means for throttling flow of air through the compressor, means responsive to the temperature of the air delivered by the compressor for regulating said throttling means, and means responsive to the compression ratio of the compressor for regulating said throttling means.

6. In combination, an enclosure, a compressor, for supplying air to the enclosure, means responsive to the amount of air delivered by the compressor for regulating the speed of the compressor, throttling means for throttling flow of air through the compressor, means responsive to the temperature of the air delivered by the compressor for regulating said throttling means, and means responsive to the compression ratio of the compressor for controlling said throttling means to the exclusion of said temperature responsive means when the compression ratio exceeds a predetermined value.

CURTIS G. TALBOT.